(12) United States Patent
Autenrieth et al.

(10) Patent No.: US 6,268,075 B1
(45) Date of Patent: Jul. 31, 2001

(54) PROCESS FOR THE WATER VAPOR REFORMING OF A HYDROCARBON OR A HYDROCARBON DERIVATIVE, REFORMING SYSTEM OPERABLE THEREBY, AND FUEL CELL OPERATING PROCESS

(75) Inventors: Rainer Autenrieth, Erbach; Stefan Boneberg, Blaustein; Dietmar Heil, Hoerenhausen; Thomas Poschmann, Ulm; Steffen Wieland, Stuttgart, all of (DE)

(73) Assignee: Xcellsis GmbH, Kirchheim/Teck-Nabern (DE)

( * ) Notice: Subject to any disclaimer, the term of this patent is extended or adjusted under 35 U.S.C. 154(b) by 0 days.

(21) Appl. No.: 09/212,289

(22) Filed: Dec. 16, 1998

(30) Foreign Application Priority Data

Dec. 16, 1997 (DE) ............................................. 197 55 815

(51) Int. Cl.[7] ................................ C01B 3/02; C01B 3/26; F28D 1/06; H01M 8/04; H01M 8/18
(52) U.S. Cl. ............................ 429/17; 422/198; 422/204; 423/648.1; 423/650; 423/652; 429/19
(58) Field of Search ....................... 429/17, 19; 423/652, 423/196, 650, 648.1; 422/197, 198, 204; 48/127.1, 127.3, 127.7, 127.9

(56) References Cited

U.S. PATENT DOCUMENTS

| 4,820,594 | 4/1989 | Sugita et al. . |
| 5,110,559 | 5/1992 | Kondo et al. . |
| 5,248,566 | 9/1993 | Kumar et al. . |
| 5,674,301 | 10/1997 | Sakai et al. . |
| 5,897,970 | * 4/1999 | Isomura et al. ........................ 429/9 |
| 6,063,515 | * 5/2000 | Epp et al. .............................. 429/17 |

FOREIGN PATENT DOCUMENTS

| 44 23 587 | 1/1996 | (DE) . |
| 4423 587 C2 | 1/1996 | (DE) . |
| 1417757 | 12/1965 | (FR) . |
| 1417758 | 12/1965 | (FR) . |
| 2 283 235 | 5/1995 | (GB) . |
| 2-160602 | 6/1990 | (JP) . |
| 3-218902 | 9/1991 | (JP) . |
| 4-160003 | 6/1992 | (JP) . |
| 4-321502 | 11/1992 | (JP) . |
| 4-338101 | 11/1992 | (JP) . |
| 40703 | * 2/1994 | (JP) . |
| 7-315801 | 12/1995 | (JP) . |
| 08231202 | 9/1996 | (JP) . |

* cited by examiner

Primary Examiner—Wayne Langel
(74) Attorney, Agent, or Firm—Crowell & Moring, L.L.P.

(57) ABSTRACT

The invention relates to a process for operating a system for the water vapor reforming of a hydrocarbon, having an evaporator, a reforming reactor, a membrane module connected behind, and a catalytic burner device. According to the invention, a first part of the catalytic burner device is in thermal contact with the reforming reactor, and a second part of the burner device is in thermal contact with the evaporator. According to the process, a heating operation is carried out during the cold start of the system, in which, in a first operating phase, at least the evaporator and the reforming reactor are heated by the catalytic burner device, and in a second operating phase, a hydrocarbon/water vapor mixture is prepared in the evaporator at a water/hydrocarbon ratio which is higher than in the normal operation and is fed to the reactor, the substance mixture emerging from the reactor being fed by way of the membrane module to the catalytic burner device.

15 Claims, 2 Drawing Sheets

PROCESS FOR THE WATER VAPOR REFORMING OF A HYDROCARBON OR A HYDROCARBON DERIVATIVE, REFORMING SYSTEM OPERABLE THEREBY, AND FUEL CELL OPERATING PROCESS

BACKGROUND AND SUMMARY OF THE INVENTION

This application claims the priority of German Application No. 197 55 815.1, filed Dec. 16, 1997, the disclosure(s) of which is (are) expressly incorporated by reference herein.

The present invention relates to a process for the water vapor reforming of a hydrocarbon in a heated environment. The present invention also relates to a reforming system which can be operated by this process. The present invention is particularly directed to a process for operating a mobile system for the water vapor reforming of methanol in a fuel-cell-operated motor vehicle for providing the hydrogen required for the fuel cells, and a system which can be operated in this manner, as well as to an operating process of a fuel cell system. For reasons of simplicity, the term "hydrocarbon", in addition to actual hydrocarbons, will also include its derivatives, such as methanol.

Japanese Published Patent Application JP 4-338101 (A) discloses a process for starting a fuel cell system fed with hydrogen by a reforming reactor. In this case, the anode exhaust gas of the fuel cells is fed to a hydrogen storage device. During starting, hydrogen from the hydrogen storage device is fed to a catalytic burner, which is in thermal contact with the reforming reaction space, and is burned therein.

In the case of a hydrogen generating system described in Japanese Published Patent Application JP 8-231202 (A), the hydrogen is obtained by the exothermal partial oxidation of methanol. By means of the heat generated thereby, a heat-conducting feeding conduit is heated to evaporate methanol fed thereto before reaching the reaction space.

U.S. Pat. No. 5,248,566 describes a fuel cell system wherein the fuel cells are fed by hydrogen on the anode side. The hydrogen is generated by a partial oxidation reforming reactor. The anode exhaust gas of the fuel cells is burned in an afterburner together with air fed thereto. The resulting generated heat is used to heat the interior of a motor vehicle which is equipped with the fuel cell system.

With a selectively hydrogen-permeable membrane, a membrane module is used to separate hydrogen generated when the system is warmed up as the result of the reforming reaction of the other constituents of the formed reformate gas. In addition to alternative approaches, such as CO conversion to carbon dioxide by CO oxidation, or the CO shift reaction, this represents a method for obtaining a product gas which consists essentially of hydrogen wherein CO concentration in the product gas does not exceed a defined low threshold value. This is important, for example, when the product gas is used as the anode gas of a fuel cell system, since there the carbon monoxide has the effect of a catalyst poison. The membrane module can be connected as a separate unit behind the reforming reactor or can be integrated in the reforming reactor. Systems of the latter type are described, for example, in German Patent Document DE 44 23 587 C2.

It is known that the water vapor reforming reaction for reforming a hydrocarbon or hydrocarbon derivative, such as methanol, takes place endothermally and at a reaction temperature which is higher than room temperature. During a cold start of the system, the water vapor reforming reaction may not immediately provide hydrogen. The system components must first be brought to a corresponding operating temperature. However, particularly when these systems are used in motor vehicles, it is desirable to have driving power for the fuel cells available as soon as possible after triggering the starting operation of the vehicle and thus also of the reforming system. This requires that the reforming system be capable of providing hydrogen as fast as possible at expenditures which are as low as possible. Various special measures for the cold start of reforming systems have been suggested for this purpose.

Thus, it is known from French Patent Documents FR 1.417.757 and FR 1.417.758, which are cited in the above-mentioned German Patent Document DE 44 23 587 C2, to introduce, during a cold start of a system for water vapor reforming of methanol, first a mixture of methanol and an oxidant into the reforming reactor in order to carry out a corresponding combustion reaction there and thus heat the reactor. Thereafter, the oxidant feed is terminated. Instead, a methanol/water vapor mixture to be reformed is fed to the reactor and the water vapor reforming reaction is started. In the system of French Patent Document FR 1.417.757, a heating space is in thermal contact with the reforming reaction space. The residual gas from the reaction space which is not diffused through a separating membrane is non-catalytically burned with oxygen in the heating space.

Special cold starting measures were also suggested for systems for water vapor reforming of a hydrocarbon without the use of a hydrogen separation stage. U.S. Pat. Nos. 4,820,594 and 5,110,559 describe systems for water vapor reforming of a hydrocarbon wherein a burner is integrated in the reforming reactor. The burner is in thermal contact with the reaction space of the reactor by way of a heat-conducting partition. During cold start, a combustible mixture is burned in this burner in an open flame. In U.S. Pat. No. 5,110,559, the mixture originates from the reforming reactor itself, in which case the combustible hydrocarbon to be reformed has already been fed to the reaction space during the cold start. The hot combustion exhaust gases of the burner integrated in the reactor are transmitted into a CO shift converter in order to heat this CO shift converter and in this manner bring the system more rapidly to the operating temperature.

SUMMARY OF THE INVENTION

The present invention addresses the above noted technical problem by providing a process and a system for the water vapor reforming as well as a fuel cell operating process of the initially mentioned type, wherein during a cold start, the system components reach their operating temperature as fast as possible so that hydrogen can be made available correspondingly fast and optionally can be utilized in fuel cells.

The invention solves this problem by providing a water vapor reforming process wherein during a cold start, the reforming system can be brought up to a normal warmed-up operating condition comparatively rapidly without high expenditures. The system can be operated even at the start at an increased operating pressure of typically approximately 10 bar and more, which is advantageous for the membrane module for promoting the hydrogen diffusion.

In a first operating phase, a catalytic burner device is heated to a temperature above the water boiling temperature by means of the catalytic combustion of a fed hydrocarbon. The fed hydrocarbon is fed from a stored amount for the purpose of reforming, and/or of intermediately stored hydrogen generated in a preceding operating cycle. In the case of on operated system according to this process, at least an evaporator and the reforming reactor are in thermal contact with the catalytic burner device by way of a respective heat-conducting partition, so that they are heated correspondingly rapidly.

In a second operating phase, which follows the first operating phase which typically lasts only a few seconds, water a n d hydrocarbon is pre-metered at a relatively high water/hydrocarbon ratio and is fed to the evaporator. The water-rich hydrocarbon/water vapor mixture arrives in the reforming reactor, where a reforming of the hydrocarbon may already occur to a limited extent. The already hydrogen-rich mixture which comes out of the reactor may optionally contain residual hydrocarbon and water. This mixture is guided while still in a hot condition into the membrane module connected behind to heat the membrane. Progressive heating of the membrane will increase its hydrogen diffusion capacity. Hydrogen which may not have diffused through and other constituents of the mixture are then transmitted from the membrane module into the catalytic burner device where the mixture participates in the catalytic combustion therein.

In another aspect of the present invention, in a third operating phase following the second operating phase, the hydrocarbon or hydrogen supply to the catalytic burner device is reduced because the system components heated by the burner device are already largely heated.

In yet a further aspect of the present invention a fourth operating phase follows the third operating phase. In the fourth operating phase, the concentration of the hydrocarbon introduced into the reforming reactor is increased with the rising temperature of the membrane module. The membrane is increasingly capable of separating the hydrogen formed by the reforming reaction.

In another aspect of the invention, the gas pressure in the membrane module and the reforming reactor connected in front of it is increased successively to the normal operating pressure during the heating operation as a function of the dew point of the heating mixture guided through the membrane module.

In a further aspect of the invention the mixture emerging from the reforming reactor, after passing through the membrane module, is cooled during at least the second operating phase before entering the catalytic burner device. This condenses out water possibly contained in the mixture so that an excessive water fraction in the catalytic burner device is avoided. This process is particularly suitable for the operation of a reforming system for reforming hydrocarbons. Such a system is equipped with a suitable cooler.

The present invention is also directed to a fuel cell operating process for reforming hydrocarbon. The combustion exhaust gas of the catalytic burner device of a water vapor reforming system is operated according to the invention for heating a cooling circulation of a fuel cell system which is fed with hydrogen generated by the reforming system.

Other objects, advantages and novel features of the present invention will become apparent from the following detailed description of the invention when considered in conjunction with the accompanying drawings.

BRIEF DESCRIPTION OF THE DRAWINGS

Advantageous embodiments of the invention are illustrated in the drawings and will be described in the following.

DETAILED DESCRIPTION OF THE DRAWINGS

Figure 1:
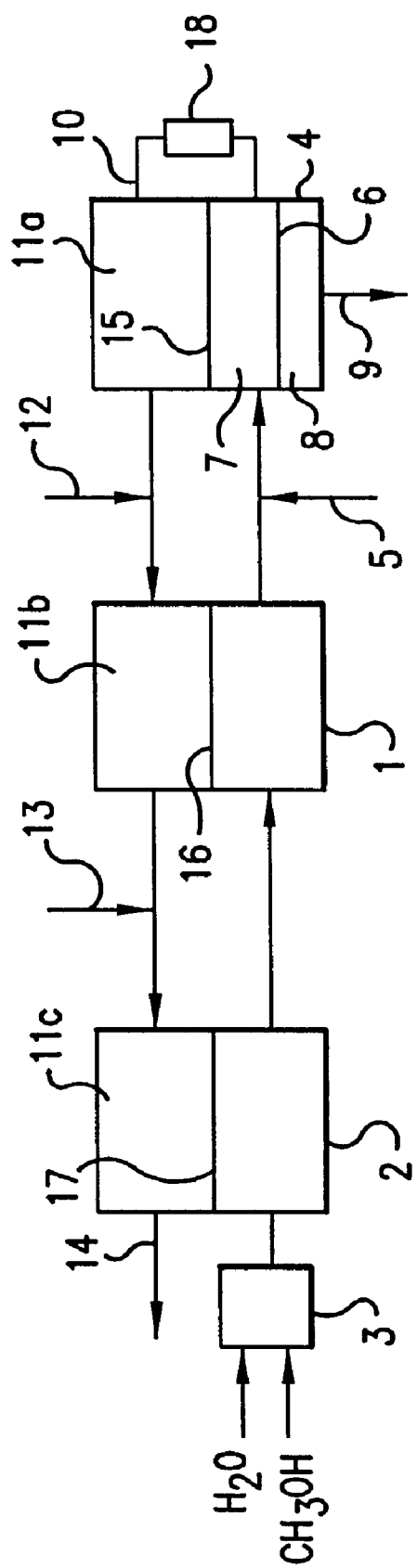
FIG. 1 is a block diagram of a water vapor reforming system.

The system of FIG. 1 illustrates a water vapor reforming of methanol in a fuel-cell-operated motor vehicle to provide the hydrogen required for the fuel cells. The system contains a reforming reactor 1 containing a catalyst material such as a Cu/ZnO material suitable for the catalyzing of the water vapor reforming reaction. An evaporator 2 is connected to one end of the reactor 1. Water and methanol from corresponding storage tanks, which are carried along in the vehicle but are not shown, can be fed by means of a corresponding metering device 3 into evaporator 2. A membrane module 4 is connected at the other end on reactor 1. An intermediate feeding conduit 5 is provided through which, if required, water and/or air may be metered into the substance mixture emerging from the reactor 1 before entering into the membrane module 4.

The membrane module 4 contains a membrane 6, which is selectively permeable for hydrogen and which divides the module space into a gas passage space 7 and a hydrogen withdrawal space 8. The inlet-side substance mixture is introduced by way of a corresponding inlet into the gas passage space 7. To the extent that it contains hydrogen and the operating condition of the membrane module 4 permits it, the hydrogen diffuses at least partially through the membrane 6 into the hydrogen withdrawal space 8, where it is withdrawn by way of a withdrawal conduit 9 and can be fed, for example, to the anode part of a fuel cell system. Furthermore, the substance mixture leaves the gas passage space 7 by way of a corresponding outlet and arrives in a connected burner connection conduit 10. In the burner connection conduit 10, a cooler 18 is situated by means of which water can be condensed out of the substance mixture guided through. Optionally, a pressure maintaining valve can also be provided in the burner connection conduit 10.

From the cooler 18, the burner connection conduit 10 leads into a first part 11a of a three-part catalytic burner device 11a, 11b, 11c. The three burner parts 11a, 11b, 11c are serially connected, a first fuel feeding conduit 12 being provided between the first and the second part 11a, 11b, and a second fuel feeding conduit 13 being provided between the second and the third part 11b, 11c. From the third burner part 11c, the combustion exhaust gas is discharged by way of an exhaust gas pipe 14. The first burner part 11a is in thermal contact with the membrane module 4 by way of a first heat-conducting partition 15. The second burner part 11b is in thermal contact with the reforming reactor 1 by way of the second heat-conducting partition 16. The third burner part 11c is in thermal contact with the evaporator 2 by way of a third heat-conducting partition 17.

Figure 2:
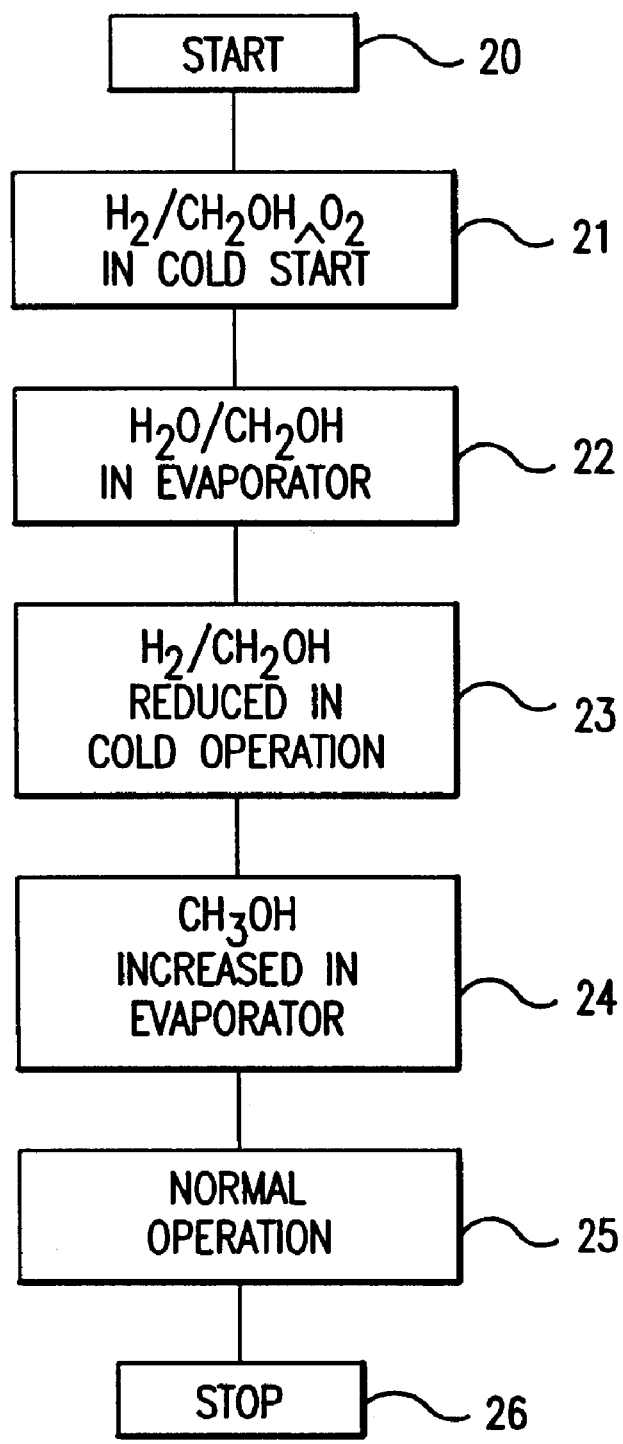
FIG. 2 is a flow chart of an operating process suitable for the system of FIG. 1.

In a cold start, the system constructed according to the present invention can be brought into normal operation very rapidly by means of the corresponding operating process wherein the system components have reached their respective normal operating condition, i.e., the raised temperature required for the water vapor reforming and the increased operating pressure additionally required for the essentially complete hydrogen diffusion through the membrane 6. An advantageous process suitable for this purpose will be explained with reference to FIG. 2, in which important steps of this process are illustrated.

After the triggering of a cold start 20 of the motor vehicle, the reforming system is initiated. In a first operating phase 21, hydrogen, which was generated in a preceding operating cycle and intermediately stored, and/or methanol together with an oxygen-containing gas, such as air, are introduced into the catalytic burner device 11a, 11b, 11c and catalytically burned there in a flameless manner. Specifically, the combustible mixture is fed in this case to the burner part 11b, which is in thermal contact with the reforming reactor 1 through first fuel feeding conduit 12. The combustion mixture is then fed to the burner part 11c, through second fuel feeding conduit 13 which is connected to burner part 11c and which is in thermal contact with the evaporator 2. The catalytic combustion process is adjusted such that these two burner parts 11b, 11c are heated to a temperature above the boiling point of water. The reforming reactor 1 and the evaporator 2 are heated approximately to this temperature level as well.

When the reforming reactor 1 and the evaporator 2 have reached the corresponding temperature level, which is typically after only a few seconds of the first operating phase, in a subsequent second operating phase 22 occurs. In this operating phase, water and methanol are metered by metering device 3 into the evaporator 2. At this point, an increased water/methanol ratio is used as compared to the later normal operation. The metered-in mixture is evaporated in the evaporator 2 and preferably overheated. The mixture is then introduced into the reforming reactor 1, where a certain methanol reforming conversion takes place. In this case, the relatively high water fraction promotes the avoidance of undesirably high CO concentrations.

The substance mixture formed in the reforming reactor 1 arrives in gas passage 7 of the membrane module 4. Depending on the momentary operating pressure and operating temperature, hydrogen, which is contained in the fed substance mixture, may already be separated and withdrawn by way of the hydrogen withdrawal conduit 9. As the membrane temperature rises, the hydrogen diffusion capacity of the membrane 6 will increase. In addition, a higher operating pressure, that is, differential pressure between the gas passage space 7 and the hydrogen withdrawal space 8, promotes the selective hydrogen diffusion. A respective appropriately high operating pressure can be adjusted by feeding a corresponding quantity of pressurized air and optionally additional water by way of the intermediate feeding conduit 5 into the connection pipe from the reforming reactor 1 to the membrane module 4. The substance mixture which is still hot, introduced into the gas passage space 7, heats the initially cold membrane 6. The high water fraction of the methanol/water vapor mixture used in this second operating phase promotes this heating of the membrane. The water acts as a heat carrier medium in order to transport heat from the evaporator 2 by way of the reforming reactor 1 rapidly to the membrane module 4. The evaporator 2 is simultaneously cooled and therefore protected from overheating.

From the membrane module 4, the substance mixture arrives in the cooler 18, where water, which may still be contained in the substance mixture, is condensed out. The substance mixture flowing out of the cooler 18 has a water fraction which does not impair the function of the catalytic burner device 11a, 11b, 11c. From the cooler 18, the substance mixture then arrives in the first burner part 11a in which the combustible material contained in the substance mixture, such as unreformed methanol and/or hydrogen not separated in the membrane module 4, is catalytically burned. The first burner part 11a, which is heated in this manner, causes a further heating of the membrane module 4 which is in thermal contact with it. As required, in addition, a direct methanol and/or hydrogen feeding into this burner part 11a can be provided analogously to the two other burner parts 11b, 11c.

In a third operating phase 23, which follows the second operating phase, the direct additional methanol and/or hydrogen feeding into the corresponding burner parts 11a, 11b, 11c is reduced successively with the increasing temperature in the evaporator 2 and in the reforming reactor 1 as well as in the membrane module 4. In a fourth operating phase 24, which overlaps with the third operating phase or follows it, the concentration of the methanol metered into the evaporator 2 is successively increased with the rising temperature of the hydrogen separating membrane 6. At this point, the metered-in methanol quantity is kept low so that its energy content is just sufficient for generating the energy for the evaporation and the endothermal water vapor reforming reaction without the occurrence of overheating in the catalytic burner device 11a, 11b, 11c due to excessive unreformed methanol fractions introduced from the reactor 1 by way of the membrane module 4 into the catalytic burner device 11a, 11b, 11c. The methanol concentration in the methanol/water vapor mixture to be reformed systematically approaches that concentration which is used in the normal operation with a warmed-up system.

During the heating operation of the system which extends throughout the above-mentioned four operating phases, the evaporator 2 and/or the reforming reactor 1 are preferably operated at a temperature which is above the normal operating temperature in normal operation in order to accelerate warming-up the system. This is achieved by the corresponding heating of the burner parts 11b, 11c. In addition, preferably during this heating operation the system pressure is increased in the membrane module 4 as a function of the dew point of the heating gas by the corresponding feeding of air/water by way of the intermediate feeding conduit 5 and continuous the control of the optional pressure maintaining valve until a normal operating pressure is reached which is used in the later normal operation.

When the reforming system is used for providing hydrogen for a fuel cell system, the hot burner exhaust gas furnished during the heating operation by way of the exhaust gas pipe 14 by the catalytic burner device 11a, 11b, 11c, can be used for heating a fuel cell cooling circulation system.

When the rising hydrogen yield at the membrane 8 and the methanol quantity fed to evaporator 2 reach values typical to normal operating conditions in a warmed up system, the system components, particularly the reforming reactor 1, the evaporator 2 and the membrane module 4, reach normal operating condition as the result of the above-described cold start operating phases, then runs in its normal operation 25. This is characterized in that the water/methanol ratio of the methanol water vapor mixture evaporated in the evaporator 2 is lower than during the second, third and fourth operating phase 22, 23, 24 of the heating operation. In addition, the differential pressure at the membrane 6 has a value of 10 bar or more, typically between approximately 10 bar and approximately 40 bar. If, during the heating operation, the evaporator 2 and/or the reactor 1 are heated to a temperature above the normal operating temperature, during transition back to the normal operation, the temperature will be set back to the normal operating temperature and heating performance of the pertinent catalytic burner parts 11b, 11c is correspondingly reduced.

Thereafter, the system will be in normal operation 25 until the vehicle is switched off. The system can then also be switched off (step 26) and can be rapidly started again in the cold system condition at a later point in time by means of the above-described process. Hydrogen can be furnished within a very short time, which is particularly advantageous for the mobile application in fuel-cell-operated motor vehicles. A relatively large intermediate hydrogen storage device is eliminated without the necessity that, when the vehicle is switched off, the reforming system must be kept in an operative warmed-up condition.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for operating a system for water vapor reforming of a hydrocarbon, comprising an evaporator, a reforming reactor, a membrane module for selective hydrogen separation and a catalytic burner device, said process comprising:

heating hydrocarbon and water, when the system is heated to a normal operation, at an adjustable ratio in the evaporator forming a heated mixture that is fed to the reforming reactor in which the hydrocarbon is subjected to water vapor reforming, and the resulting formed hydrogen is separated in the membrane module at a normal operating pressure and a normal operating temperature; and carrying out a heating operation during a cold start of the system, wherein during a first operating phase, the catalytic burner device is in thermal contact with at least the reforming reactor and the evaporator by way of respective heat-conducting partitions and is heated to a temperature above the boiling point of water and the hydrocarbon and/or the hydrogen is catalytically burned, while an oxygen-containing gas is fed thereto, wherein during a second operating phase, the water and hydrocarbon are fed to the evaporator at a water to hydrocarbon ratio that is higher than in the normal operation, and the heated mixture emerging from the reforming reactor is fed through the membrane module to the catalytic burner device.

2. A process according to claim 1, further wherein during a third operating phase of the heating operation following the second operating phase, the amount of hydrocarbon or hydrogen fed into the catalytic burner device is reduced.

3. A process according to claim 2, further wherein during a fourth operating phase of the heating operation, a hydrocarbon fraction of the hydrocarbon/water vapor mixture prepared in the evaporator is increased corresponding to a rising temperature of the membrane module.

4. A process according to claim 1, further wherein during the heating operation, the operating pressure in the membrane module is increased with a rising dew point temperature of the heated mixture guided there through.

5. A process according to claim 1, further wherein the heated mixture emerging from the reforming reactor and guided through the membrane module is cooled during at least the second operating phase to a temperature which is sufficient for condensing out water before entering into the catalytic burner device.

6. A process according to claim 2, further wherein during the heating operation, the operating pressure in the membrane module is increased with a rising dew point temperature of the heated mixture guided there through.

7. A process according to claim 3, further wherein during the heating operation, the operating pressure in the membrane module is increased with a rising dew point temperature of the heated mixture guided there through.

8. A process according to claim 2, further wherein the heated mixture emerging from the reforming reactor and guided through the membrane module is cooled during at least the second operating phase to a temperature which is sufficient for condensing out water before entering into the catalytic burner device.

9. A process according to claim 3, further wherein the heated mixture emerging from the reforming reactor and guided through the membrane module is cooled during at least the second operating phase to a temperature which is sufficient for condensing out water before entering into the catalytic burner device.

10. A process according to claim 4, further wherein the heated mixture emerging from the reforming reactor and guided through the membrane module is cooled during at least the second operating phase to a temperature which is sufficient for condensing out water before entering into the catalytic burner device.

11. A system for the water vapor reforming of a hydrocarbon comprising:

a reforming reactor, an evaporator having a metering device which is connected to one end of the reforming reactor, a membrane module connected to the other end of the reforming reactor, and a catalytic burner device wherein at least a first part of the catalytic burner device is in thermal contact with the reforming reactor through a first partition, and at least a second part of the catalytic burner device is in thermal contact with the evaporator, through a second partition.

12. A system according to claim 11, further comprising a cooler that condenses out water contained in a mixture emerging from the membrane module and being fed to the catalytic burner device, the cooler being arranged between the membrane module and the catalytic burner device.

13. A process for operating a system for water vapor reforming hydrocarbons, wherein the system comprises a catalytic burning device, an evaporator connected to one end of a reforming reactor and a membrane module connected to another end of the reforming reactor for selective hydrogen separation, the system being arranged such that during heated a normal operation, an adjustable ratio of water and the hydrocarbon to be reformed are heated in the evaporator forming a heated mixture that is fed to the reforming reactor wherein the hydrocarbon is subjected to a water vapor reforming process to form hydrogen that is separated from the heated mixture in the membrane module at a normal operating pressure and normal operating temperature, wherein the process comprises the further steps of:

carrying out a cold start heating operation before the heated normal operation that comprises the further steps of;

heating the catalytic burner device in a first operating phase to a temperature above the boiling point of water by catalytically burning the hydrocarbon and/or hydrogen while feeding an oxygen-containing gas thereto, the catalytic burner device being arranged such that it is in thermal contact at least with the reforming reactor and the evaporator through respective heat-conducting partitions; and feeding, in a second operating phase, water and hydrocarbon at a ratio higher than in the normal heated operation to the evaporator and thereafter to the reforming reactor thereby forming a heated substance mixture which is fed from the reforming reactor to the membrane module and then to the catalytic burner device.

14. A process for preheating a system for water vapor reforming of hydrocarbon comprising the steps of:

thermally connecting a catalytic burning device with at least an evaporator and a water vapor reforming reactor through respective heat conducting partitions;

heating the catalytic burning device to a temperature higher than the boiling point of water through catalytic combustion of a hydrocarbon and/or hydrogen and an oxygen containing gas in the catalytic burning device;

feeding a hydrocarbon and water mixture at a predetermined ratio to the evaporator wherein the mixture is heated by the catalytic combustion in the catalytic burning device;

feeding the heated mixture from the evaporator to the reforming reactor where the mixture is further heated by the catalytic combustion in the catalytic burning device;

feeding the heated mixture from the reforming reactor to a membrane module to heat a membrane contained therein to increase hydrogen diffusion capacity of the membrane; and feeding the heated mixture to the catalytic burning device for further catalytic combustion.

15. A process for operating a fuel cell system having a reforming system for water vapor reforming of a hydrocarbon and a cooling circulation system, said reforming system including an evaporator, a reforming reactor, a membrane module for selective hydrogen separation and a catalytic burner device, said process comprising:

heating hydrocarbon and water, when the system is heated to a normal operation, at an adjustable ratio in the evaporator forming a heated mixture that is fed to the reforming reactor in which the hydrocarbon is subjected to water vapor reforming, and the resulting formed hydrogen is separated in the membrane module at a normal operating pressure and a normal operating temperature;

carrying out a heating operation during a cold start of the system, wherein during a first operating phase, the catalytic burner device is in thermal contact with at least the reforming reactor and the evaporator by way of respective heat-conducting partitions and is heated to a temperature above the boiling point of water and the hydrocarbon and/or the hydrogen is catalytically burned, while an oxygen-containing gas is fed thereto, wherein during a second operating phase, the water and hydrocarbon are fed to the evaporator at a water to hydrocarbon ratio that is higher than in the normal operation, and the heated mixture emerging from the reforming reactor is fed through the membrane module to the catalytic burner device; and heating the cooling circulation system with exhaust gases from the catalytic burner device.

* * * * *